United States Patent [19]

Hegedus et al.

[11] Patent Number: 4,463,065
[45] Date of Patent: Jul. 31, 1984

[54] FUEL CELL AND METHOD FOR CONDUCTING GAS-PHASE OXIDATION

[75] Inventors: Louis Hegedus, Rockville, Md.; Costas G. Vayenas; James N. Michaels, both of Cambridge, Mass.

[73] Assignees: W. R. Grace & Co., New York, N.Y.; Massachusetts Institute of Technology, Cambridge, Mass.

[21] Appl. No.: 345,146

[22] Filed: Feb. 2, 1982

[51] Int. Cl.³ .............................................. H01M 8/12
[52] U.S. Cl. ........................................ 429/33; 429/39
[58] Field of Search ...................................... 429/33, 39

[56] References Cited

U.S. PATENT DOCUMENTS

| | | | |
|---|---|---|---|
| 3,472,697 | 10/1969 | Sandstede et al. | 429/32 |
| 3,533,848 | 4/1970 | Winn | 429/30 |
| 3,854,186 | 12/1974 | Sergeys | 29/157.3 |
| 4,175,165 | 11/1979 | Adlhart | 429/30 |
| 4,272,336 | 6/1981 | Vayenas et al. | 204/59 |

FOREIGN PATENT DOCUMENTS 1928300 12/1970 Fed. Rep. of Germany .
2514034 9/1976 Fed. Rep. of Germany ........ 429/30

OTHER PUBLICATIONS

T. F. Degnan, Jr. and J. Wei, "Monolithic Reactor-Heat Exchanger", *Chemical Reaction Engineering*, ACS Symposium Series 65, pp. 82–97.

"Cogeneration of Electric Energy and Nitric Oxide", *Science*, vol. 208, May 9, 1980, pp. 593–594, C. G. Vayenas & R. D. Farr.

*Primary Examiner*—M. J. Andrews
*Attorney, Agent, or Firm*—Edward J. Cabic

[57] ABSTRACT

Disclosed herein are ribbed catalyst-coated solid-state electrolyte sheets as well as a method for producing such sheets. Also disclosed is a fuel cell reactor comprising a plurality of said sheets stacked one upon another and cemented together to form a monolithic structure. Novel reactions utilizing the reactor to produce useful chemical oxidation products and/or electricity are set forth. Also disclosed is a novel wiring system to collect electrical power generated by the reactor.

38 Claims, 8 Drawing Figures

FUEL CELL AND METHOD FOR CONDUCTING GAS-PHASE OXIDATION

Chemical reactions which liberate large quantities of heat can be carried out in fuel cell reactors where a large fraction of the Gibbs energy change is converted into electricity rather than heat. This direct conversion of chemical energy into electrical energy is not subject to the Carnot limitation and therefore very high thermodynamic efficiencies can be achieved.

Solid electrolyte fuel cells operating on $H_2$ or CO as the fuel are well known. One important advantage of solid electrolyte electrochemical reactors is that they allow operation at typical temperatures of catalytic interest where electrode polarization phenomena are minimized. For example it was recently demonstrated by Vayenas et al (Science 208, 593, 1980 and U.S. Pat. No. 4,272,336) that doped zirconia cells with Pt catalyst-electrodes can be used to convert ammonia to nitric oxide with simultaneous generation of electrical energy.

A major factor determining the commercial usefulness of solid electrolyte fuel cells is their power density. Although the use of thin solid electrolyte components as in the present invention can lead to high current densities, typically 200 mA/cm$^2$ of electrolyte, previous experimentally demonstrated fuel cell designs were characterized by low electrolyte surface to reactor volume ratios, typically less than 1 cm$^2$ electrolyte/cm$^3$ reactor volume; accordingly these reactors were characterized by relatively low power densities.

In reactors of the present invention, typical electrolyte surface to reactor volume ratios of 10 cm$^2$ electrolyte/cm$^3$ reactor volume are possible.

Also relevant to the present invention is U.S. Pat. No. 3,854,186 which teaches admixing a ceramic material in particulate form together with a polymeric binder (e.g., polyethylene) and a plasticizer. The blend is admixed to achieve homogeneity and is subsequently extruded to form a ribbed sheet. Pieces of the sheet are layered in alternating fashion and sealed together to form a crossflow monolith, extracting the plasticizer and the monolith is subsequently fired to remove the binder and sinter the ceramic material.

Monolithic reactor heat exchangers have been disclosed by Degnan and Wei (Chemical Reaction Engineering, ACS Symposium Series No. 65, 1978) where the catalyst is deposited on the monolith walls and it was used to oxidize carbon monoxide.

It is also known to carry out chemical reactions in layered structures wherein the ceramic material is a solid electrolyte. Specifically, U.S. Pat. No. 4,272,336 teaches that layers of tubes can be bound into manifolds. The interior and exterior surfaces of the tubes are coated respectively with an oxygen-dissociating catalyst and a catalyst for promoting the oxidation of ammonia. In operation oxygen is dissociated by one catalyst to form oxygen ions which are transported through the solid electrolyte. At the surface of the oxidizing catalyst the oxygen ions react with ammonia to produce nitric oxide. The electrolytic reaction simultaneously produces electricity which is collected by electrical leads. In one embodiment, gas is passed through catalyst-coated tubes while a second gas is allowed to flow over the tubes in a direction perpendicular to the gas flow in the tubes. Another embodiment (FIGS. 5 and 6 of U.S. Pat. No. 4,272,336) is a series of catalyst-covered plates defining a series of parallel chambers between the plates. The chambers are divided into two groups with chambers of the first group interposed alternatively between chambers of the second group. A first (e.g., oxygen) gas is passed through chambers of the first group while simultaneously a second gas (e.g., ammonia) is passed in a perpendicular direction through the chambers of the second group. The ammonia is oxidized to form nitric oxide. Also of interest is German Offenlegungschrift No. 1928300 which describes oxidation systems very similar to those of U.S. Pat. No. 4,272,336.

DESCRIPTION OF ELECTROLYTE SHEETS

Sheets suitable for use in the fuel cell reactor described herein are prepared by a process comprising the steps of; (1) uniformly admixing a particulate inorganic filler capable, when fused, of transporting oxygen ions, an olefinic polymer having a molecular weight of about 150,000 to 5,000,000, and a plasticizer; (2) forming the admixture into a ribbed sheet; (3) extracting the plasticizer; and (4) heating the sheet to degrade and remove the organic polymer and fuse inorganic filler particles.

Figure 1:
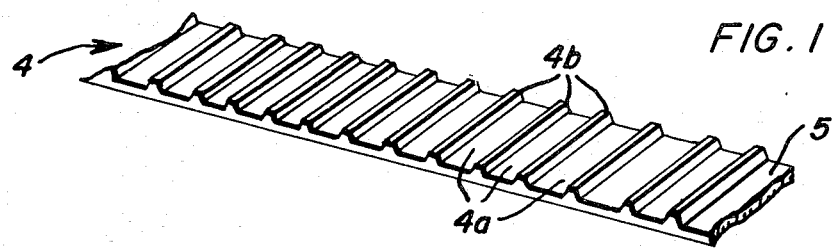
FIG. 1 is a ribbed sheet employed in preparing the fuel cell reactor of FIG. 4.
Figure 2:
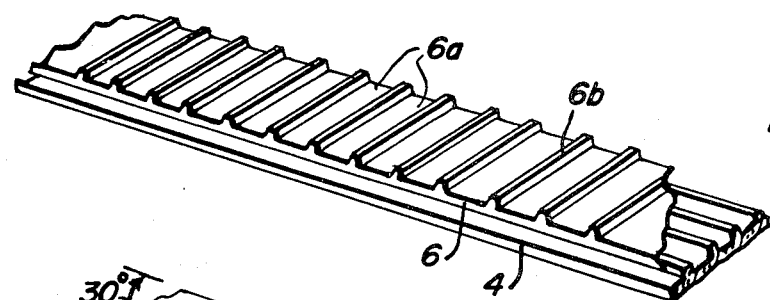
FIG. 2 is an enlarged fragmentary section from FIG. 4 depicting two catalyst-coated ribbed sheets.
Figure 2A:
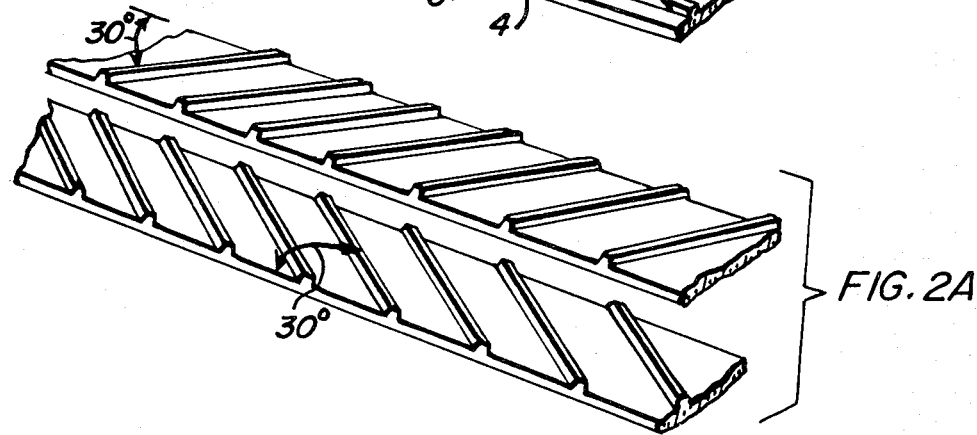
FIG. 2a depicts sheets as in FIG. 2 wherein the rib angle is 60°.

A sheet produced as described above is depicted in FIG. 1. The preparation of such a sheet is further described in Example 1. With reference to FIG. 1, the sheet 4 consists of a rectangular member composed of an inorganic, ceramic, oxygen ion transporting material, e.g., yttria-stabilized zirconia, and having a series of ribs 4b disposed in parallel on the back (i.e., ribbed) surface 5 of the sheet to form essentially parallel channels 4a. Although the ribs shown are straight, the ribs need not be linear. For example, they could also have a nonlinear shape such as a curved or zig-zag configuration so long as when they are spaced apart on the sheet they form generally parallel channels extending from one end of the sheet to the other through which the gas can flow. The other front side of the sheet has a smooth, non-ribbed surface. The sheet 4 is essentially impermeable to gas flow in the sense that gases and liquids will not pass through the sheet. A suitably impermeable sheet is set forth in Example 1. With reference to FIG. 2, two sheets 4 and 6 are positioned one on top of the other so that the ribs 4b and 6b form an angle of 90° with respect to one another. When nonlinear ribs are employed the angle formed between adjacent sheets is measured with respect to the angle formed by the direction of the parallel elongated channels in the two sheets. The channels 4a are coated with a catalyst for oxidation of a reactant (e.g., ammonia), whereas the channels 6a are coated with a catalyst for oxygen-ion formation. The reactor of FIG. 4 can also be designed to utilize sheets wherein the angles between ribs of adjacent sheets are as small as 30°. Such an arrangement can be achieved by adjusting the sheets in relation to each other while shaping the casing of the reactor to conform to the sheets. An alternative is to form ribs in the sheets at an angle other than 90°, e.g., 30°.

Figure 3:
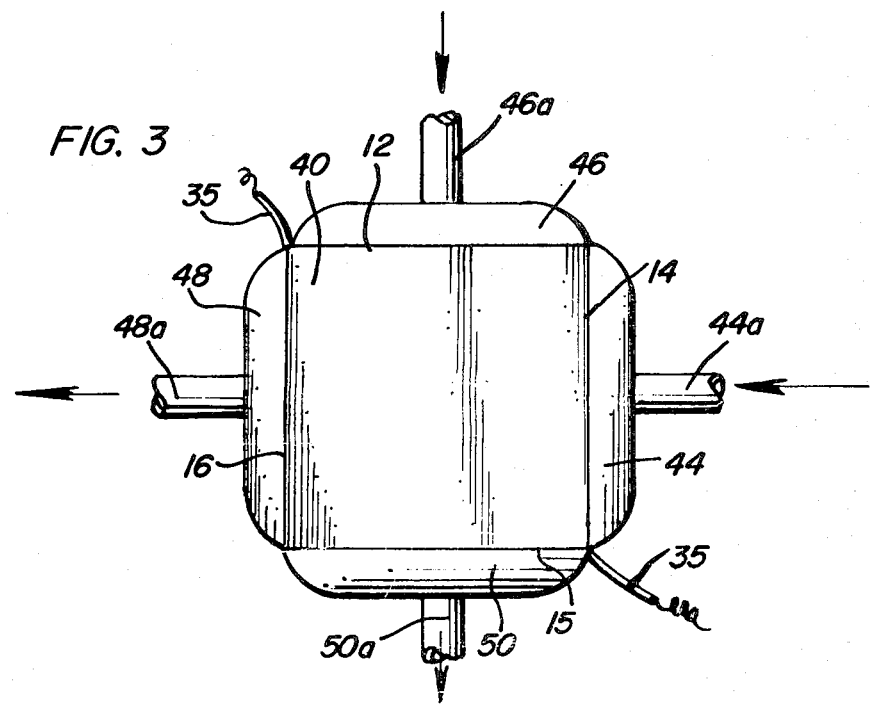
FIG. 3 is a plan view of the reactor of FIGS. 4 and 5.
Figure 4:
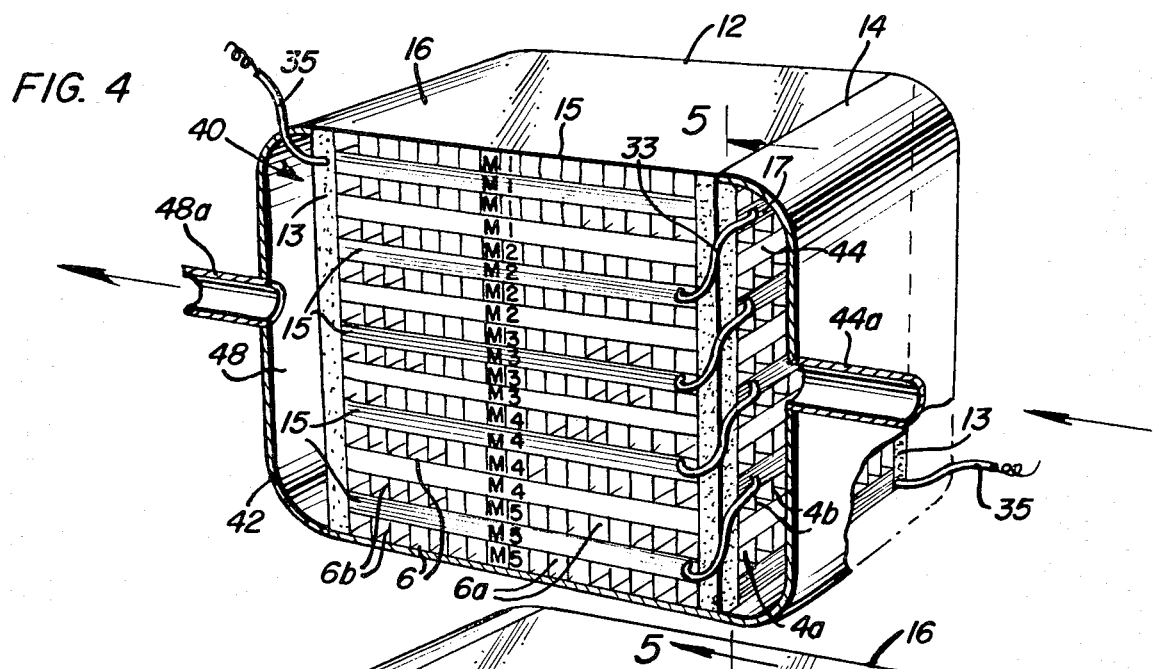
FIG. 4 is a sectional view of a fuel cell reactor which has been modified to illustrate the electrical connection between layers.

The sheets from which the layered structure of FIGS. 2, 3 and 4 is prepared are made from a starting material comprising an inorganic filler capable, in the solid state, of transporting oxygen ions. Additionally, a polyolefin and a plasticizer are employed. It is to be understood that the references made to polyolefin are generally to high molecular weight polyethylene. More specifically, a polyolefin of very high molecular weight (e.g., at least 150,000) is a good binder for ceramic powders and can tolerate high filler loadings without becoming brittle when a plasticizer is present. This is quite unlike the conventional thermoplastics, e.g., low molecular weight polyethylene for example, which have molecular weights of about 60,000 to 100,000. These low molecular weight polyethylenes yield brittle products at relatively low filler concentrations. In preparing the initial mixture the actual amounts of the filler, polymer and plastic can vary over a wide range. However for purposes of processing the blend it is important that the blend be viscoelastic in the sense that, while molten, it will possess a melt elongation. Also the blend must have a viscosity low enough to undergo molding or extrusion, and following molding the strength must be sufficient to allow removal from the mold. Generally a blend will satisfy the above parameters if the torque as measured in a Brabender Plastograph with a roller head operating at 50 rpm and 165° C. is from 200 to 2800 meter-grams and preferably 2000 to 2500 meter-grams. Also, in addition to the components described above, other materials (e.g., an inert filler or extender, or a catalyst-support material) can be employed in the blend as long as they do not adversely affect the final ceramic structure. A useful blend comprises:

1. 20 to 28 percent by volume, preferably 25 percent, of the inorganic filler;
2. 18 to 25 percent by volume of a polyethylene having a molecular weight greater than 150,000 and preferably 20 percent of ultra high molecular weight linear polyethylene (UHMW-PE). These materials are defined in ASTM D-4020-81 as having a molecular weight of over 3,100,000;
3. 47 to 62 percent by volume, preferably 54 percent, of a hydrocarbon oil plasticizer. Any oil from white mineral oil to Bunker C fuel oil can be used as a plasticizer. Additionally up to 1 percent by volume of zinc stearate may be employed as an internal lubricant to facilitate dispersion of the filler in the polymer suspension at elevated temperature. This is not a necessary additive and other similar materials may be employed.

Any solid electrolyte capable of transporting oxygen ions can be utilized herein. Typically, oxygen ion conducting solid electrolytes are solid solutions formed between oxides containing divalent and trivalent cations, such as CaO, $Sc_2O_3$, $Y_2O_3$, $La_2O_3$ or the like, with oxides containing tetravalent cations such as $ZrO_2$ $ThO_2$ and $CeO_2$. Their higher ionic conductivity is due to the existence of $O^{--}$ site vacancies. One $O^{--}$ vacancy occurs for each two divalent or each two trivalent cations that are substituted for a tetravalent ion in the lattice. Of particular interest is a solid solution containing about 15 mol percent CaO in $ZrO_2$ (calcia-stabilized zirconia) or a solid solution containing about 1 to 10 mol percent (3-7 mol percent preferred) of $Y_2O_3$ in $ZrO_2$ (yttria-stabilized zirconia). These latter two solid electrolytes are characterized by their high ionic conductivity, their pure oxygen-ion conduction over wide ranges of temperature and oxygen pressures and their relatively low cost.

Processes for forming materials into sheets such as described in FIG. 1 are well known and include compression molding and extrusion. Where the sheet is prepared by compression molding (at 165° C.) a thickness reduction ratio is employed which is as small as possible while being sufficient not to detrimentally affect the structural integrity of the sheet. Generally a thickness reduction ratio of from 0.05 to 0.5 (preferably about 0.1) is employed. This ratio is defined in U.S. Pat. No. 2,899,713 which is hereby incorporated by reference. In calculating this ratio the thickness reduction is measured only with regard to the surfaces of the sheets and does not include any protrusions such as the ribs. Similar process parameters are employed in extrusion. However the extrusion temperature is generally 30°–50° C. higher to reduce the viscosity appropriately. As can be seen by reference to FIGS. 1 and 2, the ribs provide a structure having uniform channel openings in both directions. Obviously the process of manufacture can be utilized to provide non-uniform channels if desired.

After the sheet has been formed, the plasticizer is extracted. The extraction can be accomplished by any solvent in which the plasticizer is soluble. For example, when the plasticizer is a hydrocarbon oil, it can be extracted with an organic solvent, such as hexane, heptane, pentane, and chlorinated solvents such as carbon tetrachloride, trichlorethylene, and perchlorethylene. Other organic solvents such as petroleum ether and diethylether can also be used. When the plasticizer is a water soluble compound, the plasticizer can be extracted with water. Suitable plasticizers can be soluble or insoluble in water. Representative of the water-insoluble plasticizers are organic esters such as the sebacates, phthalates, stearates, adipates and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; low molecular weight polymers such as polyisobutylene, polybutadiene, polystyrene, atactic polypropylene, ethylene-propylene rubber; ethylene-vinyl acetate copolymer; oxidized polyethylene, coumarone-indene resins and terpene resins; tall oil and linseed oil.

Illustrative of the water-soluble plasticizers are ethylene glycol, polyethylene glycol, polypropylene glycol, glycerol, and ethers and esters thereof; alkyl phosphates such as triethyl phosphate; polyvinyl alcohol; polyacrylic acid and polyvinyl pyrrolidone.

After the plasticizer has been extracted, units can be cut from the larger sheet. These units should be sized appropriately to allow for shrinkage in subsequent processing steps which can range from approximately 10 to 50 percent. It is preferred to cut the sheets into approximately final shape at this point rather than after firing, since it reduces breakage problems caused by cutting a ceramic structure.

Firing of the sheets is accomplished by heating above the degradation temperature of the thermoplastic so as to completely burn off the polyolefin. The degradation temperature will, of course, vary with the choice of polyolefin. With a high viscosity linear polyethylene, it is possible to use a temperature in the range of at least 240°–260° C. to initiate degradation. At a temperature of about 240° C. (when polyethylene is the polyolefin) the structure begins to turn black and at about 700° C. the structure begins to turn white, indicating that significant portions of the thermoplastic have been removed. Simultaneously as the thermoplastic is eliminated the filler begins to sinter, i.e., the particles begin to coalesce. To complete the sintering step, the temperature is raised well above that necessary to remove the thermoplastic. When using yttria-stabilized zirconia, for example, a temperature of about 1300° to 2000° C. is recommended, i.e., within this temperature range it is preferable to use the lowest temperature which results in sufficient sintering to produce a sheet impermeable to the gaseous reactants. The temperature is held at the sintering point long enough to complete the sintering, and then the structure is allowed to cool slowly to room temperature.

The mechanism by which fluid (i.e. gas) impermeable sheets are produced begins with degradation and removal of the polymer binder. It has been observed that if residual carbonized remnants of the binder are not removed, the carbonaceous materials act as "islands" in the flowable sintered ceramic material. Such carbonized remnant may be visible and impart a grayish coloration to the ceramic sheet. Significantly these "islands" also introduce porosity into the sheet and should therefore be removed as completely as possible. This can be conveniently accomplished by operating the firing under oxidizing conditions, at least during a portion of the firing. In using a Zircoa zirconia from Corning (particle size less than at 325 mesh, i.e. no particle exceeding about 30 microns) sintering temperatures ranging from 1400° to 1900° C. were applied but resulted in a porous sheet. By contrast, a Zircar brand zirconia (Zircar Products, Inc.) was sintered at 1370°–1500° C. to provide a fluid-impermeable sheet. The Zircar zirconia possessed a particle size of 0.1 to 0.03 microns.

The final sheet structure appears identical in shape to the structure as previously cut, except that considerable linear shrinkage takes place. The shrinkage increases with the amount of the thermoplastic and plasticizer employed. During removal of the polyolefin and sintering of the filler, constraints are placed on the sheet to minimize buckling. Following firing, electrically-conductive catalysts for oxygen dissociation or oxidation can be applied to the sheet by conventional means such as precipitation from a carrier composition, paste application, or vapor deposition.

Representative catalytic materials useful for decomposing oxygen to oxygen ion are platinum, platinum-rhodium alloy, gold, silver, or the like. Representative catalysts suitable for promoting oxidation include platinum, platinum-rhodium alloy, platinum-rhodium-palladium alloy or the like. The preferred catalyst to effect oxygen-ion formation and ammonia oxidation may comprise a platinum-rhodium alloy containing between about five and fifteen weight percent rhodium since this catalyst would be effective in promoting the desired reactions and would be capable of withstanding the reaction conditions encountered over long periods of time. The rhodium provides little catalytic activity in oxidizing ammonia but serves to stabilize the platinum under the reaction conditions.

A wide variety of catalysts can be employed in the oxidation reaction occurring in the $6a$ channels. To maintain the efficiency of the reactor the catalyst, which is electrically conductive, (both in channels $4a$ and $6a$) should be deposited in an essentially uniform and continuous, porous layer. Typical organic materials susceptible to oxidation include $C_1$ to $C_{15}$ hydrocarbons, i.e., ethylene, light olefins (i.e., $C_2$ to $C_6$), methane and light paraffins (i.e., $C_2$ to $C_6$), benzene and light aromatics, i.e., alkyl substituted ring systems such as benzene or napthalene, where the total number of carbon atoms in the alkyl substituents is from 1 to 6. Suitable catalysts and reaction conditions for oxidizing the above materials are well known in the art and include metals such as Pt, Ag, Pd, Rh, Fe, Co, Ni, V, Bi, Mo, Ru, Rh, Sn, Sb and their alloys or oxides. For the various fuel materials to be oxidized, preferred catalyst systems are as follows: platinum (for oxidation of $CO/H_2$, paraffins, olefins, and aromatics); palladium (for ethylene and $CO/H_2$); silver (for methanol, ethylene, propylene); bismuth and molybdenum (for propylene); iron (for ethylbenzene and $CO/H_2$); and nickel, cobalt and ruthenium (for $CO/H_2$). Platinum is also very useful as a catalyst for oxidizing ammonia and sulfur. In setting forth the above catalysts it should be understood that the actual active form of the catalyst may be an oxide or other form and accordingly the designation of any particular metal catalyst is intended to encompass art-recognized equivalents thereof.

DESCRIPTION OF FUEL CELL REACTOR

In describing the fuel cell reactor the term "reactor" indicates a series of stacked sheets coated with various catalysts wherein the oxidation reaction takes place. The term "fuel cell" or "fuel cell reactor" indicates a reactor which has been fitted with electrical leads to conduct current produced during the oxidation reaction. The term, "chemical reaction" includes both oxidation and oxygen dissociation. A catalyst is described as "promoting" a reaction when it enhances the rate of the reaction directly or by increasing the activity of another catalytic material.

Figure 5:
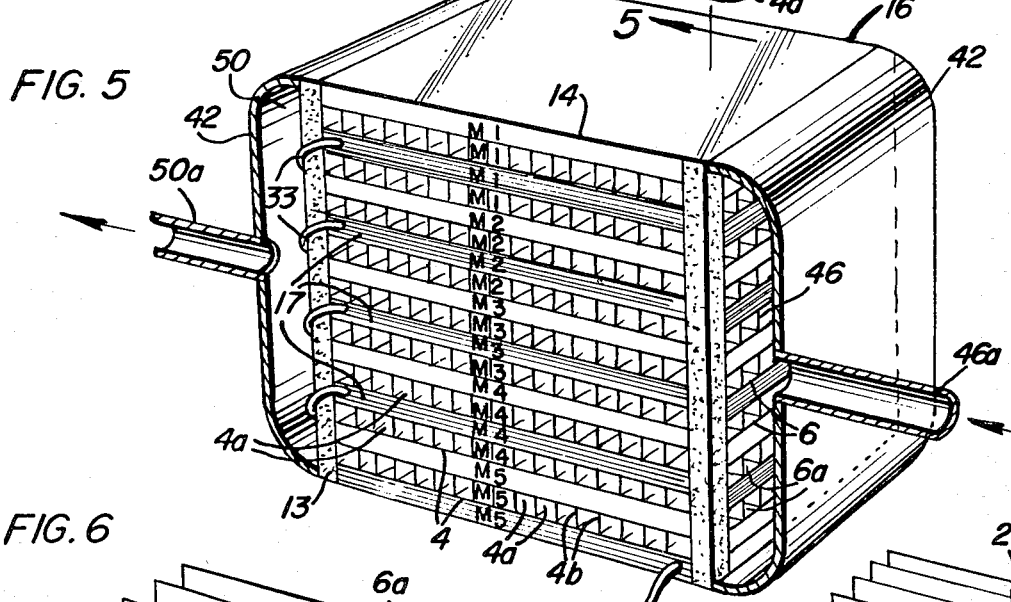
FIG. 5 is a sectional view of the reactor of FIG. 4 rotated 90° which also contains the additional electrical connection.

From sheets such as those described in FIGS. 1 and 2, a one piece integral fuel cell reactor can be constructed. With reference to FIGS. 2 through 5, the reactor 40 comprises a plurality of stacked essentially planar parallel sheets 4 and 6 consisting essentially of a fluid-impermeable solid electrolyte such as that employed to make the sheets of FIGS. 1 and 2. Each sheet possesses a plurality of parallel elongated channels $4a$ and $6a$ separated by ribs $4b$ and $6b$ extending perpendicularly to the longitudinal plane of the sheet. The sheets are also divided into two groups (4 and 6) based upon function and the alignment of the channels. The channels $6a$ of the first group have an electrically conductive oxygen-dissociating catalyst disposed in an essentially continuous layer therein whereas the channels $4a$ of the second group have a reaction-promoting catalyst disposed in an essentially continuous layer therein. In the reactor of FIGS. 4 and 5, the channels $4a$ and $6a$ possess a "roof" (not shown) formed by the back of the adjacent sheet restino on ribs $4b$ or $6b$, e.q. for the $4a$ channels the roof is formed by the backside of the adjacent sheet 6 which contacts ribs $4b$. For the $6a$ channels the roof is formed by the backside of the adjacent sheet 4 which contacts ribs $6b$. Preferably the roof for each channel is coated with an essentially continuous layer of the catalyst contained in the channel. After fabrication of the reactor, if a catalyst is applied to the channels $4a$ in the reactor by inserting a probe into the channel and "swabbing" the channel and rib surfaces, the roof portion can also be coated with catalyst by the same procedure and at the same time. Examples of suitable catalysts are set forth above. The sheets 6 of the first group are interposed in an alternate manner between the sheets 4 of the second group with the channels 6a of sheets in the first group forming an angle of from 30° to 90° (preferably 90°) with regard to the channels 4a of the second group. The reactor is also fitted with electrical leads (described below) to transport electricity produced during operation of the reactor. The reactor 40 is contained within a casing 42 composed of a material which withstands the temperatures and gaseous materials utilized in operation of the fuel cell reactor. Suitable casing materials include for example, steel, ceramics and various high temperature, chemically resistant plastics.

Casing 42 defines plenum chambers 44, 46, 48 and 50 and corresponding ports 44a, 46a, 48a and 50a. The opposing faces of the reactor are respectively 14, 12, 16 and 15 (see FIG. 3). The plenum chambers are not in direct fluid contact with each other, i.e., gases entering one plenum chamber can only be received into a second chamber after passing through channels of the reactor.

With reference to FIGS. 4 and 5, port 44a and plenum chamber 44 are adapted to receive a reactant gas to be oxidized (e.g., ammonia) and port 48a is adapted to receive the oxidized gas (e.g., nitric oxide) and pass it to the purification and collection apparatus (not shown). Port 46a and chamber 46 are adapted to receive the oxidizing gas (e.g., air or oxygen or a mixture thereof, or oxygen entrained in an inert gas) and port 50a is adapted to pass the depleted oxidizing gas to the atmosphere or to a purification and regeneration system (not shown).

The fuel cell reactor, and particularly the ribbed sheet members are designed to possess numerous advantages. For example, a significant function of the ribs, in comparison with sheet structures containing no ribs, is to expose the various gases to greatly increased amounts of the catalytic surface thereby possibly permitting the reaction rate to be enhanced. Additionally the catalyst coating on the ribs is electrically conductive and contributes to efficiency by diminishing localized charge build-up and resulting power losses. The catalyst coating is also thermally conductive and by distributing heat is designed to provide improved temperature control for the catalytic reactions.

The numerous ribs also support adjacent sheets thereby enabling these sheets to be relatively thin, e.g., 100 microns to 1 millimeter in thickness. Suitably the sheets can have a thickness of 200 to 300 microns. Because the sheets are composed of a solid electrolyte which transports oxygen ions, the reduced thickness of the sheet also reduces the travel distance of the oxygen ions prior to reaction at the surface of the catalyst on adjacent sheets. This contributes to the efficiency of the reaction, i.e., it is contemplated that at a given temperature the reaction rate will be greater than if thicker sheets were employed which did not possess the ribs. The use of thin sheets is also believed to reduce internal heating of the reactor. The supportive action of the ribs also permits larger reactors to be constructed than would otherwise be possible with electrolyte materials of similar thickness. The reactors of the invention enable a relatively large electrolyte surface area to be obtained, e.g., the electrolyte surface/reactor volume ratio can be from 5 to 50 or even higher as the thickness of the sheets is decreased and/or as the height of the ribs is decreased.

In operation, a chemical oxidation reaction is conducted in the reactor by passing an oxidizing gas (e.g., oxygen) into chamber 46 and subsequently through channels 6a. Simultaneously a reactant gas (e.g., ethylene or ammonia) is passed into chamber 44 and through channels 4a. In the 6a channels the oxidizing gas contacts an oxygen-dissociation catalyst and yields oxygen ions which migrate through the zirconia sheet. At the same time the electrons consumed by oxygen reduction result in a current in the conducting catalyst layer and the reactant gas is oxidized to form a product, e.g., ethylene oxide. Thereafter the depleted oxidizing gas passes through chamber 50 and is removed and the reactant gas (now a product gas) passes through chamber 48 and subsequently to any necessary facilities (not shown) for collection, concentration and/or purification. Suitable reaction temperatures and conditions for oxidation of ammonia are described in U.S. Pat. No. 4,272,336 incorporated herein by reference. Catalysts for other materials, e.g., paraffins and ethylene, are set forth above. During the oxidation reaction electricity is produced and collected by electrical leads as described below.

Conceptually (and with reference to FIG. 6) the reactor can be considered as comprising a plurality of units 21 each having a sheet with channels 6a for dissociation of oxygen and a sheet with channels 4a for oxidation of the chemical feed material (e.g., ammonia). The channels 4a can be connected electrically by a suitable lead 23, to the channels 6a of the adjacent unit. It will be understood by those skilled in the art that the lead can be either a "hard" wiring system or can be "painted" onto the surface of the various units using conductive materials which are then cured by well known methods. Suitable conductive materials and methods of application and curing include application of silver dispersions in butyl acetate with a binder followed by drying at room temperature and calcination e.g., at about 450° C.; or application of a platinum solution or dispersion followed by drying and calcination. A suitable platinum material is Englehard Platinum "Ink" A3788 which can be dried at 100° C. and calcined at 800° C. for 4 to 6 hours. This wiring scheme is continued on through the cell, i.e., the units 21 are wired in series.

Figures 6, 7:
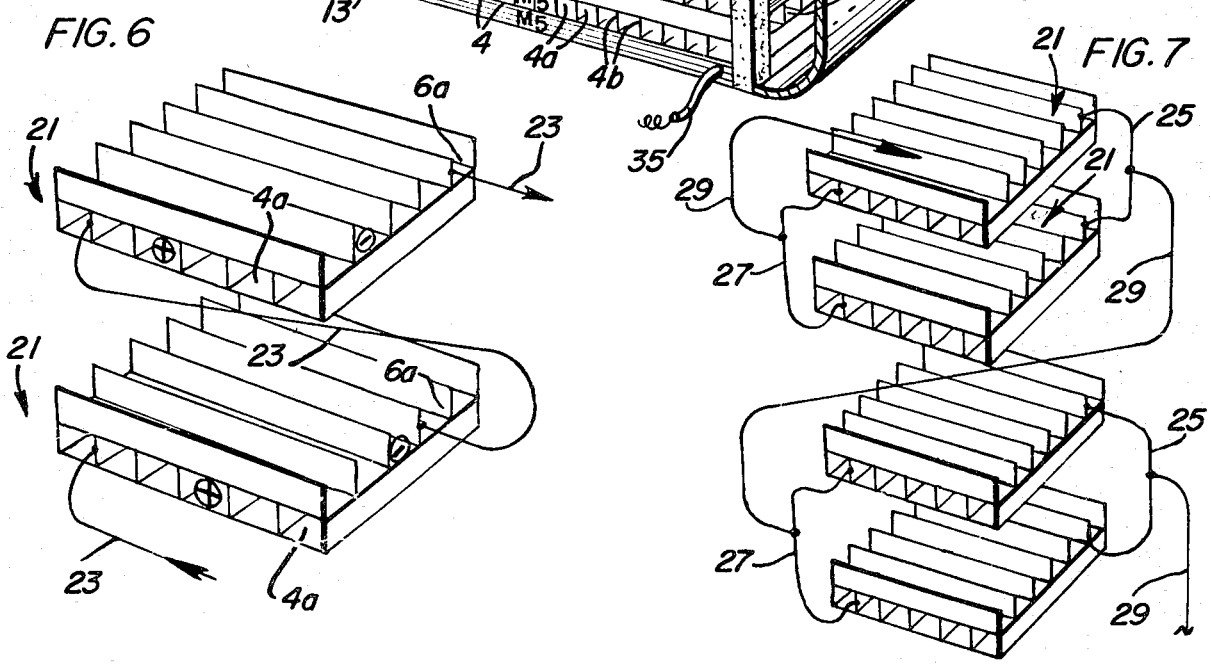
FIG. 6 depicts a possible series wiring format for the reactor of FIG. 4.
FIG. 7 depicts a modified series wiring format for the reactor of FIG. 4.

A practical problem arises however in connection with this method of wiring in that the lead 23 is relatively long and due to the small size of the channels (as well as the lead length) it is tedious and difficult to wire the units without causing numerous short circuits. If desired therefore, an alternative wiring system (as depicted in FIG. 7) has been developed whereby two units 21 are wired in parallel by suitable leads 25 and 27. The parallelly wired units are then connected by a suitable lead 29. This scheme can be continued on through the reactor. The net result of wiring the cell as in FIG. 7 is that conceptually the adjacent units wired together in parallel can be considered as a single minicell and thus the cell itself can be considered as a series of minicells each composed of four sheets (designated as M1, M2, etc. in FIGS. 4 and 5). Each minicell is connected to each adjacent minicell, preferably by wiring in series. This is the format depicted in FIG. 7. As discussed above the leads 25, 27 and 29 can be hard wiring or utilizing conventional technology can be painted onto the cell using suitable conductive materials as exemplified above. As compared with the strict series wiring format of FIG. 6, the parallel-wiring scheme discussed above is advantageous in that the electrical leads are shorter and there is reduced risk of short-circuiting the cell. It will be understood that "series" wiring contemplates formats such as those depicted in either of FIGS. 6 or 7. With regard to FIGS. 4 and 5, during construction the end channels are filled with a non-conductive, heat-curable cement to form transverse strips 13. Also on face 12 of the reactor the external surfaces 15 (which correspond with the side wall of a rib) of the sheets 4 are coated with an electrically conductive material, e.g., the silver/butyl acetate composition described above. The external surfaces 17 of sheets 6 on face 14 are likewise coated with electrically conductive material. The coatings on surfaces 15 contact the electrically conductive catalyst layer deposited in channels 6a and thereby collect current from adjacent sheets 6. Similarly the coatings on surfaces 17 contact the electrically-conductive catalyst layer in channels 4a and thereby collect current from adjacent sheets 4. The layers labelled "M1" can all be viewed as forming a single minicell. Similar minicells are formed by the layers labelled M2, M3 and M4. The minicell M5 is incomplete (but still operable) due to the lack of a second sheet 4. Using the format described in FIG. 7, the minicells M1, through M5 are wired in series by leads 33 which can be either hard wiring or "painted" circuits as described above. Although FIGS. 4 and 5 are midsectional views of the reactors, the electrical leads 33 have been added to show the electrical connections between the layers that exist at the edges of the reactor. Thereafter the current is transported through external leads 35 to perform work. When considering the flow of electric current, one can see that the sheet which separates the lower channel M1 from the upper channel M2 in effect is shorted because the two catalyst layers on its two sides are connected electrically through the external connector 33. Similarly, for the sheets separating the lower channel of M2 from the upper channel of M3, etc. This wiring configuration does not prevent the remaining parts of the device from performing. If desired, the current produced by the fuel cell reactor can be partly utilized to produce heat to maintain the temperature of the reactor as necessary to carry on the dissociation and oxidation reactions.

It will also be understood by those skilled in the art that, rather than producing power, the reactor can be connected to an external source of electrical current so that the rate of oxidation in the reactor is enhanced, i.e., external current can be used to enhance the rate of flow of the oxygen ions through the solid electrolyte. Obviously if an outside current source is utilized the fuel cell cannot be operated in the range of the diffusion current, i.e., the current must not cause reduction of the solid electrolyte. Also the current must not detrimentally affect the catalytic materials employed. In wiring the reactor where an external power source is employed, it is preferable to wire the sheet (or "units" described above) in parallel to maximize the current provided to each sheet and/or unit. It will also be understood by those skilled in the art that the reactor can be used to dissociate (electrolyze) oxygen-containing compounds such as water or nitric oxide by connecting the reactor to an external source of current with the positive pole of said source connected to the channels from where $H_2O$ or NO is flowing.

To manufacture the cross-flow monolithic reactor, the sheets are placed in adjacent face-to-back relationship, i.e., the ribs protruding from each sheet contact the "back" or "non-ribbed" face of each adjacent sheet. Also the sheets of the first group having channels carrying a catalytic-oxygen dissociating material, are alternately interposed between the sheets of the second group. The channels of the first group of sheets form a predetermined angle (e.g., 30°–90°) with channels of the second group. During stacking, a ceramic heat-curable adhesive is applied to each sheet and, after the desired number of sheets have been stacked, the resulting layered structure is heated (i.e., fired) to cure the cement and bind the sheets together into an integral ceramic article. Suitable cementing compositions include ceramic silica cement (e.g., Dylon C-3 cement by Dylon Industries); water glass; and ground Pyrex® glass slurry in water applied and melted to form a glaze. Where sheets as in FIG. 1 are employed, the oxygen-dissociating catalyst and the reaction-promoting catalyst are applied to alternate layers either before or after assembly of the reactor. The catalysts can be applied by "painting" the channels with the catalyst composition to form an essentially continuous coating. Subsequently the catalyst composition is cured, preferably during the firing step.

After firing, the fuel cell reactor is essentially complete with the exception of the electrical leads depicted in FIGS. 4–7. With reference to FIGS. 4 and 5, the electrically conductive coatings 15 and 17 are applied by painting the appropriate surfaces with conductive compositions e.g., either silver or platinum as described above. The conductive coating is cured by heating to an appropriate temperature, e.g., for platinum the curing temperature is 800°–850° C.

In the embodiment of the invention depicted in FIGS. 4 and 5, the cured reactor is also fitted with strips 13 by filling the end channels of the cell with an appropriate non-conductive material such as the cementitious materials described above. The strips 13 are optional but add to the strength of the cell and provide a barrier which facilitates wiring and reduces the possibility of short circuits. If necessary, the material used to form the strips is cured by heating. Optionally (and preferably) the strips 13 and conductive coatings 15 and 17 are cured during the firing step which cements the layers.

The leads 33 can be either hard wiring or a painted conductor. If hard wiring is used (e.g., copper, silver or platinum wiring) such wiring is conveniently positioned on the reactor before curing the conductive coatings 15 and 17. If painted circuits are employed these can be applied at the same time as coatings 15 and 17.

It will be realized by those skilled in the art that the electrical leads (including the conductive coatings 15 and 17) depicted in FIGS. 4 and 5 are but one possible design for collecting current from the reactor. If the channels are of sufficient size, all hard wiring could be employed. Alternatively the conductive layers 15 and 17 could also be positioned differently, e.g., to carry out the wiring format described in FIG. 6.

EXAMPLE 1

A composition was prepared by admixing 11.5 grams of particulate polyethylene, 82.3 grams of yttria-stabilized zirconia, i.e., zirconia containing about 12 weight percent $Y_2O_3$, and 27.5 grams of mineral oil. The zirconia was Zircar FYP, by Zircar Products, Inc. (Florida, N.Y.). This zirconia has a high surface area in comparison with Zircoa. The components were mixed in a commercially available shear-type mixer heated to 165° C. The composition was compacted at about 200 psi and 160° C. to form a sheet 0.5 mm in thickness. Subsequently this sheet was contacted with a plate containing parallel grooves having an average width of 0.3 mm and a depth of 1.25 mm. The grooves were tapered and measured about 15 percent more at the surface of the plate than at the bottom of the groove. The distance from center to center of the grooves was 3 mm. The sheet was compressed against the plate to a thickness of 0.25 mm, causing the plastic mass to flow into the grooves. The sheet also possessed ribs conforming to the grooves of the plate, i.e., the ribs were disposed in parallel with a height of 1.25 mm and a distance of 3 mm from center to center. The ribbed sheet was cooled in the press and removed. Removal was facilitated by previous application of a silicone release agent. The plasticizer was extracted by refluxing in methyl chloroform at a temperature of 79° C. for about 60 minutes. The resulting sheet was porous and consisted essentially of polyethylene and the inorganic filler. The sheet was cut in squares measuring 63 mm on a side. Thereafter the squares were placed between fluorocarbon covered parallel plates and heated above the melting point of the polyethylene (i.e., above 110° C.) for 5 minutes to allow the plastic to relax while preventing warping of the sheet and were cooled while restrained between the parallel contacting plates. Minor shrinkage, i.e., less than 10 percent resulted. Thereafter the squares were placed on a flat alumina surface covered with a thin layer of yttria-stabilized zirconia powder functioning as an antifriction agent. The squares were stabilized sufficiently by shims and cover plates to prevent excess vertical movement but to allow horizontal movement. Thereafter the stabilized squares were heated in a kiln for about 12 hours to degrade and remove the polyethylene and sinter the inorganic filler particles. The temperature employed for sintering was about 1450° C. and was maintained for at least 2 hours. During heating the sheet experienced a linear shrinkage of about 30 to 40 percent. The sheet was essentially non-porous to gas permeation as determined by fluid permeation; i.e., a fluid such as ink when placed on one side of the sheet would not penetrate to the other side as a result of capillary action. In the case of hairline cracks not visible by eye, the ink would show immediately on the other side.

EXAMPLE 2

A sheet was made following the procedure of Example 1 except that a shim was used in the heating step which varied in thickness in a manner similar to the sheet. In Example 1 the shims placed around the sheet being heated were ceramic and had a fixed thickness which remained constant during the heating. As the sheet was heated, it shrank and as it attempted to buckle, it would contact the cover plate which prevented excess vertical movement. However, since the sheet became thinner on shrinking, there was more space between the sheet and the fixed height of the cover plate which permitted some minor buckling.

This possible buckling was further reduced by placing around the sheet shims which were each made by fitting together two small pieces of the same ribbed sheet material being heated with the ribs of one fitting in between the ribs of the other. The height of the shim was one sheet thickness higher than the ribbed sheet being covered and as the heated sheet shrunk in height so also did the shim which in turn lowered the height of the cover plate. The ribbed sheet produced by this method was even flatter than the sheet made by the method of Example 1.

EXAMPLE 3

Two ribbed zirconia sheets made by the method of Example 2 have been used to make a very simple test fuel cell. The sheets were first coated on both sides with a catalyst by applying a platinum ink (Bright Platinum Ink, Engelhard A-3788 made by Engelhard Industries) to the surface and then heating to 800° C. This procedure was repeated two more times to obtain an electrically conductive, porous catalyst coating. Then two catalyst coated ribbed sheets were cemented together with the ribs of one touching the back of the other. This assembly was sealed into a slot in a zirconia pipe. The assembly extended out from the pipe with the channels between the two sheets formed by the ribs in a fluid flow connection with the inside of the pipe. The conducting catalyst coating on the inside channels of the assembly formed by the ribs between the two sheets were connected with one silver wire while the coatings on the two outside surfaces were connected to a second silver wire. These two wires formed the terminals of the cell.

The unit was placed in an electric furnace at a temperature of about 800° C. Ammonia was fed into the pipe and it flowed out of the slot, through the channels between the two sheets while air was supplied to the outside surfaces through a separate non-contacting stainless steel manifold.

This test cell initially gave 0.056 watt which demonstrated the operability of the system. Unfortunately, the voltage at constant current dropped over time and the structure cracked on cooling.

What is claimed is:

1. A fuel cell comprising a plurality of stacked essentially planar parallel sheets of a fluid-impermeable solid electrolyte capable of transporting oxygen ions, each sheet possessing a plurality of parallel elongated channels separated by ribs, said sheets divided into first and second groups wherein the sheets of said groups are interposed in an alternate manner, the channels of said first group forming an angle with the channels of said second group, the channels of said first group having a catalytic, oxygen-dissociating material disposed therein and the channels of the second group having a catalyst for promoting oxidation reactions disposed therein, said electrolyte sheets having exterior surfaces coated with an electrically conductive material contacting the catalyst disposed in the channels of at least one adjacent sheet, each of said exterior surface coatings in electrically conductive communication with lead means adapted to communicate with an exterior electrical circuit.

2. A fuel cell as in claim 1 wherein each sheet has at least one exterior coated surface and wherein the catalyst carried in the channels of each sheet is in contact with the exterior coating on each adjacent sheet.

3. A fuel cell as in claim 2 wherein the exterior coatings in contact with the oxygen-dissociation catalyst in one set of channels are electrically connected in series to the exterior coatings in contact with the reaction-promoting catalyst in the adjacent channels.

4. A fuel cell as in claim 1 wherein the sheets of the reactor are divided into minicells, each minicell consisting of four adjacently disposed sheets divided into two sets wherein the channels of the first set are electrically connected in parallel and have an oxygen-dissociating catalyst disposed therein and wherein the channels of said second set are electrically connected in parallel and have a reaction-promoting catalyst disposed therein, said first set electrically connected in series with said second set.

5. A fuel cell as in claim 4 wherein each minicell is electrically connected in series with each adjacent minicell.

6. A fuel cell as in claim 1 wherein the solid electrolyte comprises yttria-stabilized zirconia.

7. A fuel cell as in claim 6 wherein the oxygen-dissociating catalyst comprises platinum.

8. A fuel cell as in claim 6 wherein the oxygen-dissociating catalyst comprises a platinum-rhodium alloy.

9. A fuel cell as in claim 6 wherein the reaction-promoting catalyst comprises platinum.

10. A fuel cell as in claim 6 wherein the reaction-promoting catalyst comprises a platinum-rhodium alloy.

11. A fuel cell as in claim 1 wherein the solid electrolyte comprises calcia-stabilized zirconia.

12. A fuel cell as in claim 11 wherein the oxygen-dissociating catalyst comprises platinum.

13. A fuel cell as in claim 11 wherein the oxygen-dissociating catalyst comprises a platinum-rhodium alloy.

14. A fuel cell as in claim 11 wherein the reaction-promoting catalyst comprises platinum.

15. A fuel cell as in claim 11 wherein the reaction-promoting catalyst comprises a platinum-rhodium alloy.

16. A fuel cell comprising a plurality of stacked essentially planar-parallel sheets of a fluid-impermeable solid electrolyte capable of transporting oxygen ions, each sheet possessing a plurality of parallel elongated channels separated by ribs, said sheets divided into first and second groups wherein the sheets of said groups are interposed in an alternate manner, the channels of said first group forming an angle with the channels of said second group, the channels of said first group having a catalytic, oxygen-dissociating material disposed therein and the channels of the second group having a catalyst for promoting oxidation reactions disposed therein, said reactor fitted with conductive means to transport electricity.

17. A fuel cell as in claim 16 wherein the conductive means is adapted to transport electrical current produced during operation of the cell to an external circuit.

18. A fuel cell as in claim 16 wherein the solid electrolyte comprises yttria-stabilized zirconia.

19. A fuel cell as in claim 18 wherein the oxygen-dissociating catalyst comprises platinum.

20. A fuel cell as in claim 18 wherein the oxygen-dissociating catalyst comprises a platinum-rhodium alloy 21. A fuel cell as in claim 18 wherein the reaction-promoting catalyst comprises platinum.

22. A fuel cell as in claim 18 wherein the reaction-promoting catalyst comprises a platinum-rhodium alloy.

23. A fuel cell as in claim 16 wherein the solid electrolyte comprises calcia-stabilized zirconia.

24. A fuel cell as in claim 23 wherein the oxygen-dissociating catalyst comprises platinum.

25. A fuel cell as in claim 23 wherein the oxygen-dissociating catalyst comprises a platinum-rhodium alloy.

26. A fuel cell as in claim 23 wherein the reaction-promoting catalyst comprises platinum.

27. A fuel cell as in claim 23 wherein the reaction-promoting catalyst comprises a platinum-rhodium alloy.

28. A method for conducting gas-phase oxidation reactions comprising:
   (a) passing an oxygen-containing gas and a reactant gas into a fuel cell comprising a plurality of stacked essentially planar parallel sheets of a fluid-impermeable solid electrolyte capable of transporting oxygen ions, each sheet possessing a plurality of parallel elongated channels separated by ribs, said sheets divided into first and second groups wherein the sheets of said groups are interposed in an alternate manner, the channels of said first group forming an angle with the channels of said second group, the channels of said first group having a catalytic, oxygen-dissociating material disposed therein and the channels of the second group having a catalyst for promoting oxidation reactions disposed therein, said reactor fitted with conductive means to transport electricity;
   (b) passing the oxygen-containing gas through the channels of said first group of sheets to produce oxygen ions which are transported through the electrolyte to the surfaces of the catalyst-coated channels of the group two sheets;
   (c) passing the oxygen-reactive feed gas through the group two channels to react with the oxygen ions;
   (d) collecting the oxygen-containing gas following passage through the group one channels; and
   (e) collecting the product-containing reactant gas following passage through the group two channels.

29. A method as in claim 28 wherein the channels of said first group of sheets possess a catalyst for oxidizing ammonia to nitric oxide and water.

30. A method as in claim 28 wherein the oxygen-reactive gas is ethylene.

31. A method as in claim 28 wherein the oxygen-reactive gas is a light olefinic hydrocarbon.

32. A method as in claim 28 wherein the oxygen-reactive gas is methane.

33. A method as in claim 28 wherein the oxygen-reactive gas is a light paraffinic hydrocarbon.

34. A method as in claim 28 wherein the oxygen-reactive gas is benzene.

35. A method as in claim 28 wherein the oxygen-reactive gas is a light aromatic hydrocarbon.

36. A method as in claim 28 wherein the oxygen-reactive gas is a mixture of carbon monoxide and hydrogen.

37. A method as in claim 28 wherein the solid electrolyte is yttria-stabilized zirconia.

38. A method as in claim 28 wherein the electrolyte is calcia-stabilized zirconia.

* * * * *